Jan. 11, 1944.　　　　C. H. WHITE　　　　2,339,124
DISK HARROW
Filed April 29, 1940　　　　4 Sheets-Sheet 1

INVENTOR:
CHARLES H. WHITE
BY
ATTORNEYS.

Jan. 11, 1944.  C. H. WHITE  2,339,124
DISK HARROW
Filed April 29, 1940   4 Sheets-Sheet 3

INVENTOR:
CHARLES H. WHITE
BY
ATTORNEYS.

Jan. 11, 1944.   C. H. WHITE   2,339,124
DISK HARROW
Filed April 29, 1940   4 Sheets-Sheet 4

INVENTOR:
CHARLES H. WHITE
BY
ATTORNEYS.

Patented Jan. 11, 1944

2,339,124

UNITED STATES PATENT OFFICE 2,339,124

DISK HARROW

Charles H. White, Moline, Ill., assignor to Deere & Company, Moline, Ill., a corporation of Illinois Application April 29, 1940, Serial No. 332,218

34 Claims. (Cl. 55—83)

The present invention relates generally to agricultural implements and is more particularly concerned with disk harrows of the double action type, although certain features of this invention also are applicable to disk harrows of the single action type.

The object and general nature of this invention is the provision of a double action disk harrow in which the front and rear gangs are connected together by linkage which is so arranged that the front gangs effectively hold the rear gangs in their proper angled operating position. Considered more broadly, it is a feature of this invention to provide a disk harrow gang with means so connected therewith as to be swung through a considerable angular extent by only a relatively small amount of movement of the gang itself, whereby additional resistance acting against said means by virtue of its new position more than counterbalances the additional resistance encountered by the gang, whereby said means is particularly effective for stabilizing the gang and holding it in the proper angle. In this respect, the present invention is in the nature of an improvement over the tandem disk harrow shown in my Reissue Patent 22,333.

More specifically, it is a feature of this invention to arrange generally laterally extending links between the companion front and rear gangs so that when the gangs are in their operating angled position, the links and arms are so arranged that the line extending through each link passes fairly close to the pivot of the associated front gang, whereby the resistance of the front gangs to displacement acts with such effectiveness against the rear gangs as to hold them against displacement even when one encounters substantial additional resistance as compared with the resistance encountered by the other rear gang.

It is also a feature of the present invention to provide a tandem disk harrow in which the front and rear gangs are swung at the same time into and out of angled working position and in which the front and rear gangs at each side of the harrow are connected together for swinging movement by a linkage arrangement which provides for approximately constant or uniform movement of both gangs from their straightened transport position into their angled working position but in which additional angular displacement of one gang causes a rapidly accelerated movement of the other gang. The latter gang can therefore serve as a control for the first gang, holding the same up to its work notwithstanding considerable variations in the soil resistances encountered.

Another feature of the present invention resides in certain improvements in the transversely disposed springs by which the gangs are held against upthrust, and in this connection it is also a feature of the present invention to provide cushioning means limiting the swinging movements of certain of the gangs.

Another important feature of the present invention is the provision of a double action or tandem disk harrow which is especially constructed so as to be quickly and easily converted into a single action disk harrow, whenever desired. Further, it is a feature of this invention to provide means for rigidly fixing the drawbar or hitch means to the front gangs.

These and other objects and advantages of the present invention will be apparent to those skilled in the art after a consideration of the following detailed description, taken in conjunction with the accompanying drawings.

In the drawings:

Figure 1 is a top or plan view of a preferred form of disk harrow in which the principles of the present invention have been incorporated;

Figure 2 is a view similar to Figure 1 but showing the action of the linkage between the front and rear gangs, whereby a relatively small amount of displacement of the latter tends to cause a relatively large displacement of the front gangs, so that in operation the front gangs serve to hold the rear gangs in proper working position irrespective of variations in the resistance to forward travel encountered by the rear gangs;

Figure 1:
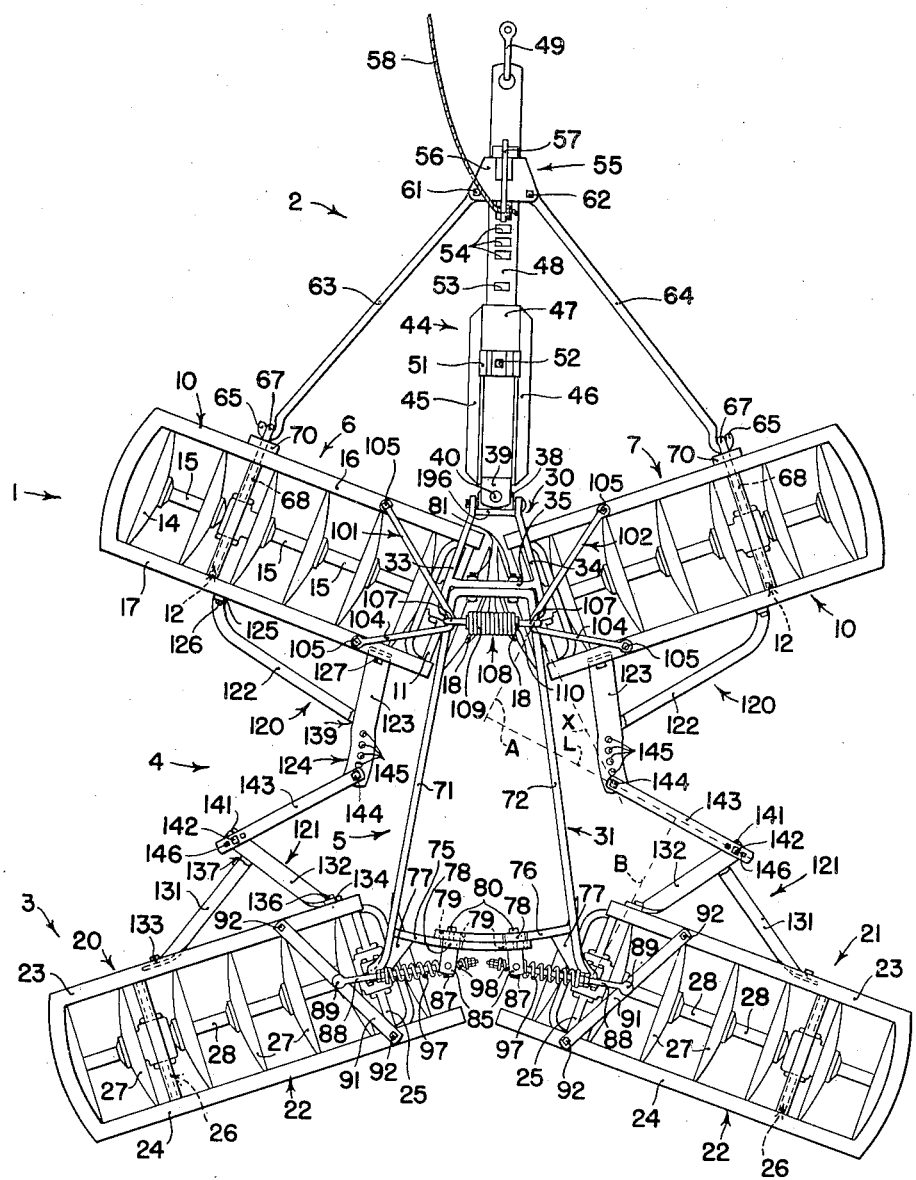
Figure 2:
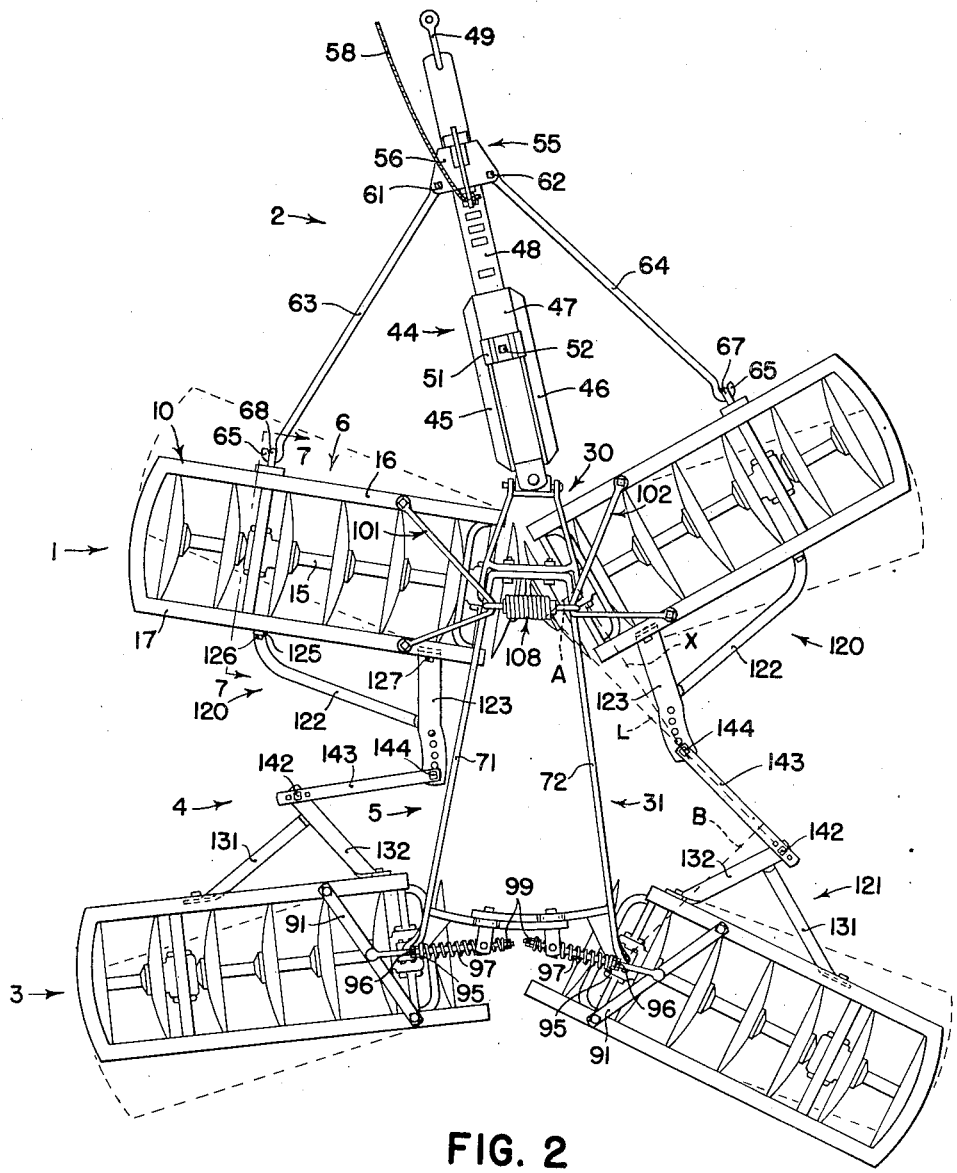

The preferred form of harrow, as shown in Figures 1 and 2, comprises a front set of gangs, indicated in its entirely by the reference numeral 1, to which hitch means 2 is pivotally connected, a rear set of gangs 3 and connections therebetween including angling linkage 4 and frame means 5.

The front set of gangs includes a right-hand gang 7 and a left-hand gang 6, each gang including a frame 10 and laterally inner and outer brackets 11 and 12 which receive the bearings in which the disk shaft or bolt is journaled for rotation. Disks 14 are mounted on the gang bolt and are held in proper spaced relation by spools 15, as in conventional construction. Preferably, the frame 10 of each gang consists of angle members, including a front frame angle 16 and a rear frame angle 17 arranged preferably with their vertical flanges extending downwardly to facilitate receiving the connecting linkage 4 as will be explained below. It will be noted that the front disks 14 are arranged to throw the soil laterally outwardly, and hence the front gangs 6 and 7 are termed outthrow gangs. The inner end of each gang bolt of the front gangs receives a bumper 18, and the bumpers 18, as shown in Figure 1, are normally in rolling contact when the harrow is in operation, sustaining the laterally inwardly directed thrusts due to the soil pressure against the lower edges of the disks 14.

The rear set of gangs is of similar construction, embodying two gangs 20 and 21, each having a frame 22 including front and rear angle members 23 and 24, together with suitable brackets 25 and 26 upon which the gang bolt supporting the disks 27 is journaled for rotation and upon which the disks 27 are maintained in spaced apart relation by spacing spools 28. It will be noted that the rear disks 27 throw the soil laterally inwardly in operation, and hence the rear gangs are termed inthrow gangs.

The frame means 5 consists of two frame parts indicated generally by the reference numerals 30 and 31. The front frame includes a pair of generally forwardly converging bars 33 and 34 which are connected together by a transverse bar 35. The rear end of each of the front frame bars 33 and 34 terminates in a downwardly disposed portion which is connected to the inner bearings of the front gangs 6 and 7 in such a manner that the latter may swing both in a generally horizontal plane as well as in a generally vertical plane relative to the frame means. Preferably, the frame connections with the front gang inner bearings are made in the manner suggested in my prior patent mentioned above, and hence further description is unnecessary. The forward converging portions of the front frame member 30 terminate in downwardly extending apertured ends which are spaced apart and receive therebetween a pivot block 38 which is connected with the frame bars 33 and 34 by a transverse pivot bolt or pin. A generally U-shaped yoke 39 is pivoted to the block 38 by a vertical pivot pin or bolt 40, these parts forming a part of the hitch means 2 that is connected with the front gangs.

Figure 7:
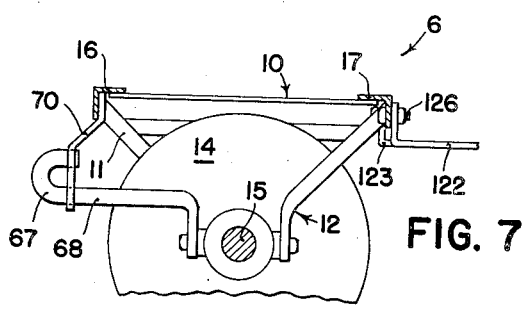
Figure 7 is a view of one of the front hitch connections, being a section taken substantially along the line 7—7 of Figure 2.

The hitch 2 includes, in addition to the pivot block and yoke mentioned above, a drawbar 44 which consists of a pair of laterally spaced members 45 and 46, the rear ends of which are welded or otherwise permanently fixed to the yoke 39. A pair of upper and lower plates 47 are fixed to the forward ends of the members 45 and 46 and slidably disposed therebetween is a channel member 48 having a draft clevis 49 at its forward end and carrying at its rear end a stop member 51. If desired, a member similar to member 51 may be secured to the under side of the member 48, both being connected to the channel member 48 by a bolt or other means as indicated at 52. The channel is apertured, as at 53 and 54, and movable along the apertured section of the channel member 49 is a slide or yoke 55 which consists of upper and lower plates 56. The upper plate 56 carries a latch 57 which is controlled by a cable 58 and may be engaged with any one of the channel apertures 53 and 54. The slide or yoke 55 is formed so as to receive pivots 61 and 62 by which the forward ends of a pair of draft links 63 and 64 are connected thereto. Since the hitch construction described above is substantially the same as the hitch means shown in my above-mentioned patent, further description is believed to be unnecessary, except to point out that the rear ends of the links 63 and 64 are bent in the form of hooks or loops 65 and are respectively engaged with the looped ends 67 (Figure 7) of the front bearing bracket members 68, which form a part of the bearing brackets indicated generally by the reference character 12. The front looped end of each member 68 is received in a plate 70 which is fixed to the front frame member 10 of the associated front gang.

The frame means 5, in addition to the front frame member 30 mentioned above, also includes the rear frame member 31, the latter comprising a pair of generally fore and aft extending frame members 71 and 72, the rear ends of which terminate in downwardly extending parts which are connected with the inner bearings of the rear gangs 20 and 21 in substantially the same manner as disclosed and claimed in my above-mentioned patent, whereby the rear gangs 20 and 21 are permitted to swing both generally horizontally and vertically relative to the rear frame section 31. The rear ends of the frame bars 71 and 72 carry laterally inwardly directed arms 75 and 76. These arms are of generally arcuate formation and are arranged in overlapping relation. Gusset plates 77 of the proper curvature are welded to the downwardly curved ends of the frame bars 71 and 72 and to the adjacent portions of the arms 75 and 76 for strengthening this portion of the rear frame section. Each of the arms 75 and 76 includes a boss or widened portion 78 which is apertured, and the adjacent overlapping portion of the other arm is provided with a plurality of apertures 79. A bolt 80 is adapted to be inserted through each apertured section 78 and the adjacent portion of the other arm for rigidly securing the rear ends of the rear frame section in spaced apart relation. By inserting the bolts 80 through the proper openings 79, the spacing between the rear gangs may be varied, as pointed out in my prior patent identified above.

In addition to serving as means adjustably fixing the width between the rear gangs 20 and 21, the bolts 80 have another function. Each bolt serves to connect a U-shaped bracket 85 to the rear frame section 31, and each bracket 85 pivotally supports a swivel 87 in which the inner end of a thrust member 88 is received. The outer end of each member 88 has a downturned section 89 which is connected for rocking movement in a transverse bracket 91 bolted, as at 92, to the front and rear frame bars of the associated rear gang. An adjusting collar 95 is fixed, as by a lock nut 96, to each of the thrust members, which are threaded, and a relatively heavy compression spring 97 is disposed between each of the collars 95 and the associated swivel 87, the latter being formed to receive the inner end of the associated spring 97. A lighter spring 98 is disposed on each thrust member 88 at the side of the swivel member 87 opposite the spring 97, and a pair of lock nuts 99 serve as an abutment against which the laterally inner end of each spring 98 bears, the outer end thereof bearing against the swivel 87. It will be seen from Figure 1, that the springs 97 and 98, and associated parts, are disposed generally between the rear ends of the longitudinal frame members 71 and 72, the laterally outer portions of the thrust members 88 extending laterally outwardly of the rear frame section 31 over the downwardly curved rear ends of the frame bars 71 and 72.

The function of the relatively heavy compression springs 97 is to hold the outer ends of each of the rear gangs 20 and 21 in the ground. It will be noted that the disks 27 are inthrow disks, and hence in operation the laterally outer disks tend to rise out of the ground, due to the fact that the pivot bearings by which each gang is pivoted to the associated frame means are above the points of soil pressure against the lower edges of the disks. Sometimes, of course, the terrain is uneven and irregular, and if depressions are encountered the laterally outer ends of the rear gangs may tend to swing downwardly more than is desirable. According to the present invention, the auxiliary compression springs 98 serve to limit the downward swinging of the laterally outer end of each of the rear gangs, the springs 98 cushioning such movement of the gangs.

In the case of the front gangs 6 and 7, which are outthrow gangs, the soil pressure acts against the disks 14 of the two gangs in such a way that the outer ends tend to dig into the ground and the laterally inner ends tend to rise out of the ground, whereas in the case of the rear gangs the opposite is true. According to the present invention I provide means independent of the frame means 5 for resisting upthrust of the frame gangs, and such means will now be described. Brackets 101 and 102 are fixed to the frames of the front gangs 6 and 7, each bracket consisting of a generally V-shaped rod 104, the ends of which are bolted, as at 105, to the associated front and rear frame bars. The apex of each of the V-shaped rod members 104 is arranged to lie above the associated frame means and each is adapted to receive the eye 107 of an adjustable tension member 108. As shown in Figures 1 and 2, the member 108 consists of a tension spring 109, one end of which is connected to one of the eyes 107 by a fixed connection while the other end is connected by an adjustable connection, as indicated at 110. In the present harrow, as shown in Figure 1, the rear pivots 89 are substantially over the axes of the disk bearings, and the front tension member 108 may be similarly arranged, if desired. Preferably, however, the member 108 engages the brackets 101 and 102 at points rearwardly of the pivots between the front frame section 30 and the laterally inner bearings of the front gangs 6 and 7. As pointed out in the above-mentioned patent, arranging the upthrust resisting means in this fashion results in a construction in which the greater the angle of the disks, the greater the effectiveness of the upthrust resisting means. It will also be observed that the rear spring means acts between the frame and the rear gangs while the front upthrust resisting means acts independently of the frame and directly from one gang to the other. This is the preferred construction since the frame as a whole tends to move with the rear gangs if they should operate in a laterally inclined plane relative to the plane of operation of the front gangs, yet such lateral inclination of the frame as results from such operation does not tend to raise one front gang and lower the other, as might occur if the front upthrust resisting means reacted against the frame. In other words, it is preferable that the upthrust resisting means for the gangs which are normally spaced apart should be connected with the frame, whereas for the gangs which react against one another, as by contacting bumper plates, the upthrust resisting means may be connected directly from one gang to the other and entirely independent of any frame means associated therewith. In some cases, however, especially where soil conditions are generally uniform and the work is not heavy, the upthrust resisting means for the rear gangs may be connected directly from one gang to the other and also independently of any associated frame means, as will be pointed out below.

As in the construction shown and claimed in my above-mentioned prior patent, the angle of the rear gangs is controlled by the angle of the front gangs through suitable linkages connecting the fore and aft gangs at each side of the harrow, and the angle of the front gangs is controlled by the hitch means 2 which may be operated to angle or straighten the gangs as desired. According to the principles of the present invention, the connections between the front and rear gangs are arranged so as to give to the front gangs a mechanical advantage or leverage which in normal working position is sufficient to hold the rear gangs against any tendency to swing out of their proper working position even though one of the rear gangs encounters a resistance considerably greater than the resistance encountered by the other rear gang. Such novel connections will now be described.

Secured to each front gang is an angling lever indicated in its entirety by the reference numeral 120, and secured to each rear gang is an angling lever indicated in its entirety by the reference numeral 121. Each front angling gang lever assembly 120 includes a compression section 122 and a tension section 123 which is extended to form an apertured arm 124. The compression section has an unturned end 125 which is bolted, as at 126, to the rear side of the depending flange of the rear frame angle 17. The front end of the tension section 123 is also turned up but is disposed on the forward side of the depending flange of the rear frame angle 17, being secured in place by a bolt 127.

Each of the forwardly extending angling arms 121 for the rear gangs 20 and 21 comprises a tension section 131 and a compression section 132. The rear end of the former is turned upwardly and disposed behind the flange of the forward frame angle 23, being secured thereto by a bolt 133, and the rear end of the compression section 132 is turned up, as at 134, and is disposed against the forward face of the flange of the forward frame angle 23, a bolt 136 secures the end 134 to the frame of the associated gang. The forward end of the tension section 131 is welded, as at 137, or otherwise secured to the compression section 132 so as to form a part thereof. In a similar way, the rear end of the compression section 122 of the forward angling arm member 120 is welded, as at 139, or otherwise fixed to the tension section 123 to form a part thereof.

Each rear angling arm member 121 has its compression section 132 extended, as at 141, and apertured to receive a pivot bolt 142 by which the rear end of an angling link 143 is pivotally connected therewith. The forward or inner end of each angling link 143 is connected by a pin or bolt 144 in one of the several openings 145 that are formed in the rear or arm section 124 of the angling arm assembly 120 of the associated front gang. It will be noted from Figure 1 that when the gangs are in angled working position the links 143 extend forwardly in converging relation. Each link 143 is provided at its outer or rear end with a plurality of openings 146 to receive the outer or rear pivot 142.

It will be noted, particularly from Figure 1, that the above described relation of the links 143 and associated parts result in an arrangement in which the perpendicular distance, indicated at A, from the longitudinal axis of each link 143 to the pivot axis at the inner end of the associated front gang is appreciably less than the perpendicular distance, indicated at B, from the longitudinal axis of the link 143 to the pivot axis of the associated rear gang, or, in other words, the axis of each of the links 143 when the gangs are in working position passes much closer to the pivot axis of the associated forward gang than the pivot axis of the rear gang. Expressed in another way, according to the present invention, the links 143 are so disposed that when the gangs are in angled working position, each link approaches a straight line relation with respect to a line X extending from the pivot 144 to the pivot axis of the associated front gang.

The advantages of this construction are threefold. First, where the lever arm A is shorter than the lever arm B, the axis of the associated link 143 being indicated by the reference character L, any given displacement of the rear gang acts through the connecting linkage to cause an appreciably greater movement of the front gang connected therewith. Therefore, if one of the rear gangs should encounter an additional resistance and tend to swing backwardly due to such increased resistance, the associated front gang is swung forwardly a much greater amount, which results in the front gang encountering a materially increased resistance. This additional resistance encountered by the front gang therefore acts through a much shorter lever arm, as indicated at A, and is therefore effective, acting through the relatively long lever arm B against the rear gang, to restore the rear gang back to its normal working position. In other words, a given displacement of the rear gang, which tends to take place when the rear gang encounters an additional resistance, tends to cause such amplified or accelerated movement of the forward gang into a position of increased resistance that the increased resistance against the rear gang is more than overcome, with the result that the front gang actually holds the rear gang in operating position, regardless of the fact that one of the rear gangs encounters an additional resistance not encountered by the other rear gang. Second, due to the fact that in normal working position, each link 143 approximates a straight line relation with respect to a line X connecting the pivot 144 of the link 143 to the associated front gang pivot, any continued rearward swinging movement of either rear gang relative to the frame causes a rapidly increasing rate of movement of the front gang, due to the fact that if the rear gang actually swings rearwardly, the axis L of the link 143 rapidly approaches the front gang pivot, and as will be readily understood as this line approaches the pivot, any given angular displacement of the rear gang causes a multiplied displacement of the front gang. Therefore, since the front gang is swung forwardly at an increasingly accelerated rate when the rear gang moves rearwardly under increased resistance, the gangs may be said to be over-compensated in that whatever the resistance encountered by the rear gangs, the resulting amplified movement of the front gangs associated therewith causes the same to be moved into a position where such increased resistance is overcome. That is to say, the greater the resistance and momentary displacement of the rear gang, the shorter will become the lever arm A and hence the greater will be the effectiveness of the additional resistance which the front gang encounters in restoring the harrow to normal angled position.

Third, it will be noted that the front gangs 6 and 7 are operating in unworked ground whereas the rear gangs are operating in the soil loosened by the front gangs. Therefore, for any given angular position of the gangs, the pressure of the soil against the disks of the front gangs, especially the end thrust effective in a direction axially of the disks, is appreciably greater than the corresponding end thrust against the rear gangs. The front or outthrow gangs are inherently stable, regardless of the relation between the end thrusts which are imposed on the front and rear gangs, and since the front gangs are subjected to greater end thrusts than the rear gangs and the linkages are such that a small displacement of either of the rear gangs tends to cause a much greater displacement of the companion front gang, it will readily be seen that the front gangs exert a great steadying effect on the rear gangs. This is an important feature of this invention.

It is to be understood that, while I have in the description above referred to small displacements of the rear gang as causing relatively large displacements of the front gang and in Figure 2 have shown the gangs displaced a substantial amount from their normal operating position, such displacements do not normally occur, the displacements indicated in Figure 2 being shown only to illustrate the relations involved. Tests have shown that in operation the front gangs hold the rear gangs in their normal working position, as shown in Figure 1, and that substantial variations in soil resistance encountered by the rear gangs actually cause no apparent displacement of the gangs. As at present understood, it is believed that normal variations of soil resistance encountered by the rear gangs are counterbalanced by perhaps an imperceptible change in the position of the front gangs. It will be remembered, in the first instance, that the front gangs are inherently stable, and that therefore it would take an appreciable force to shift the front gangs even a small amount out of their normal position, and in the second instance, it will be remembered that the end thrusts against the front gangs are appreciably greater than the end thrusts against the rear gangs, due to the fact that the front gangs operate in unworked soil. Thus, only a slight change in the position of one of the front gangs relative to the other makes available a relatively large force tending to prevent the rear gang from moving out of position. Further, since the linkages between the front and rear gangs are such that the front gang tends to be displaced angularly at a much greater rate than the corresponding displacement of the associated rear gang, this relatively great force or end thrust against the front gangs acts through the multiplied leverage afforded by said linkages and prevents the rear gangs from moving out of their normal position. It is to be understood, therefore, that normally there is little, if any, perceptible displacement of the gangs, although in the above and subsequent description, I have referred to the gangs as being displaced. This is only for purposes of explanation and to disclose what is believed to be the action of the gangs in the clearest possible form.

Figure 2 illustrates the relations described above and shows the harrow in the position it would occupy if, by virtue of some additional resistance of sufficient magnitude encountered by the right rear gang, the latter would momentarily be swung an additional four or five degrees rearwardly beyond its normal working position, as shown in Figure 1 and in dotted lines in Figure 2. From Figure 2 it will be noted that this additional four or five degrees of rearward movement of the rear gang 21 results in swinging the associated link 143 into practically a dead-center relationship with respect to a line joining the pivot 144 and the inner pivot of the associated front gang 7. In this position, of course, the additional soil resistance encountered by the front gang 7 exerts tremendous power, due to the lever arm A approaching zero, and acts to hold the rear gang 21 up in angled position, regardless of the magnitude of the additional resistance which it encounters. It will be remembered that the front gangs 6 and 7, being outthrow gangs, are inherently stable and when displaced laterally there is always a restoring force which they are enabled to exert. This restoring force, by virtue of the linkages just described, is best made effective through the shortened lever arm A to resist any tendency for additional resistances encountered by either of the rear gangs from throwing the harrow out of angled working position.

From the actions described above, it will be seen that the soil resistance normally acting against the rear gangs stresses the members 131 in tension and the members 132 in compression, hence the outer or rear end of each member 131 is connected on the rear side of the flange of the associated frame bar while the end 134 is connected on the front side, thereby relieving the bolts 133 and 136 of all tensile stresses. Likewise, the forces which each rear gang exert on the angling arm assembly 120 of the associated front gang stress each member 122 in compression and the member 123 in tension. Therefore, the upturned end of the latter is disposed on the front side of the flange of the rear frame bar while the upturned end of the compression member 122 is disposed on the back side of the frame angle flange, thus relieving the connecting bolts 126 and 127 of tensile stresses.

Figure 3:
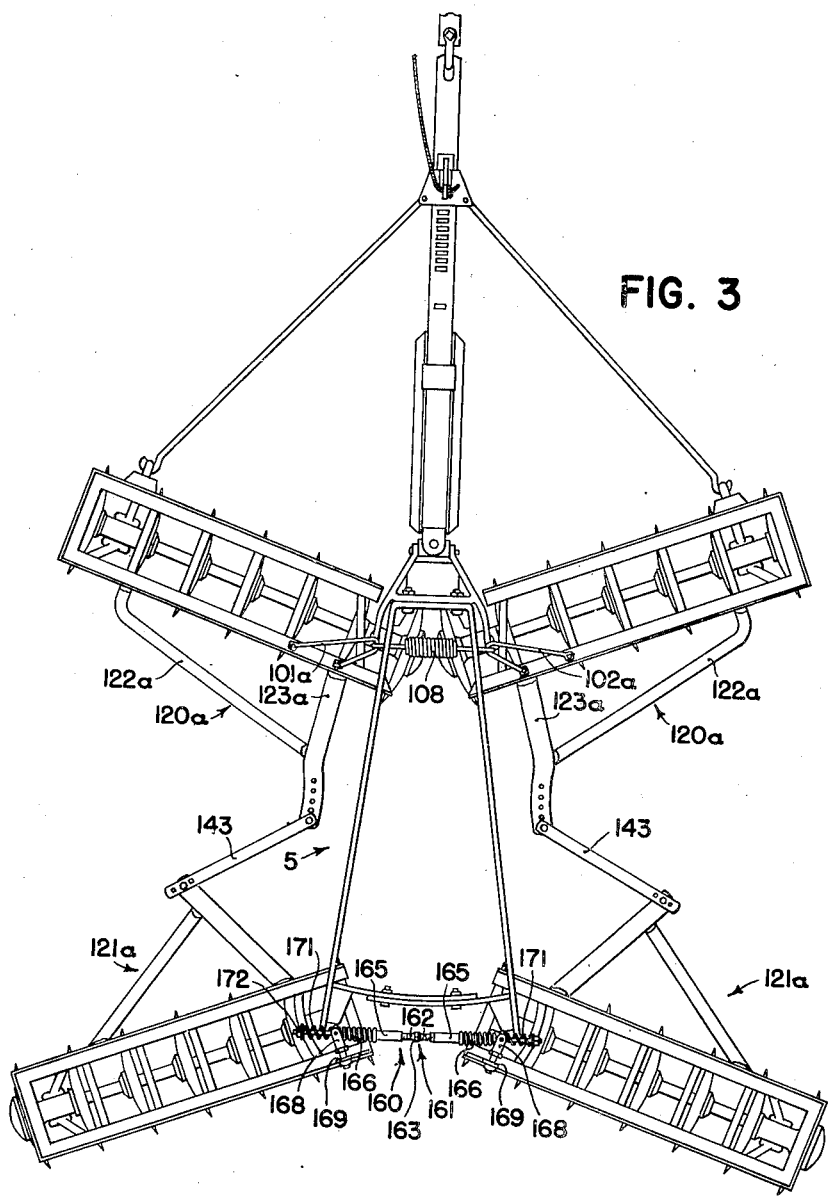
Figure 3 is a view similar to Figure 1 but showing a modified form of harrow.
Figure 4:
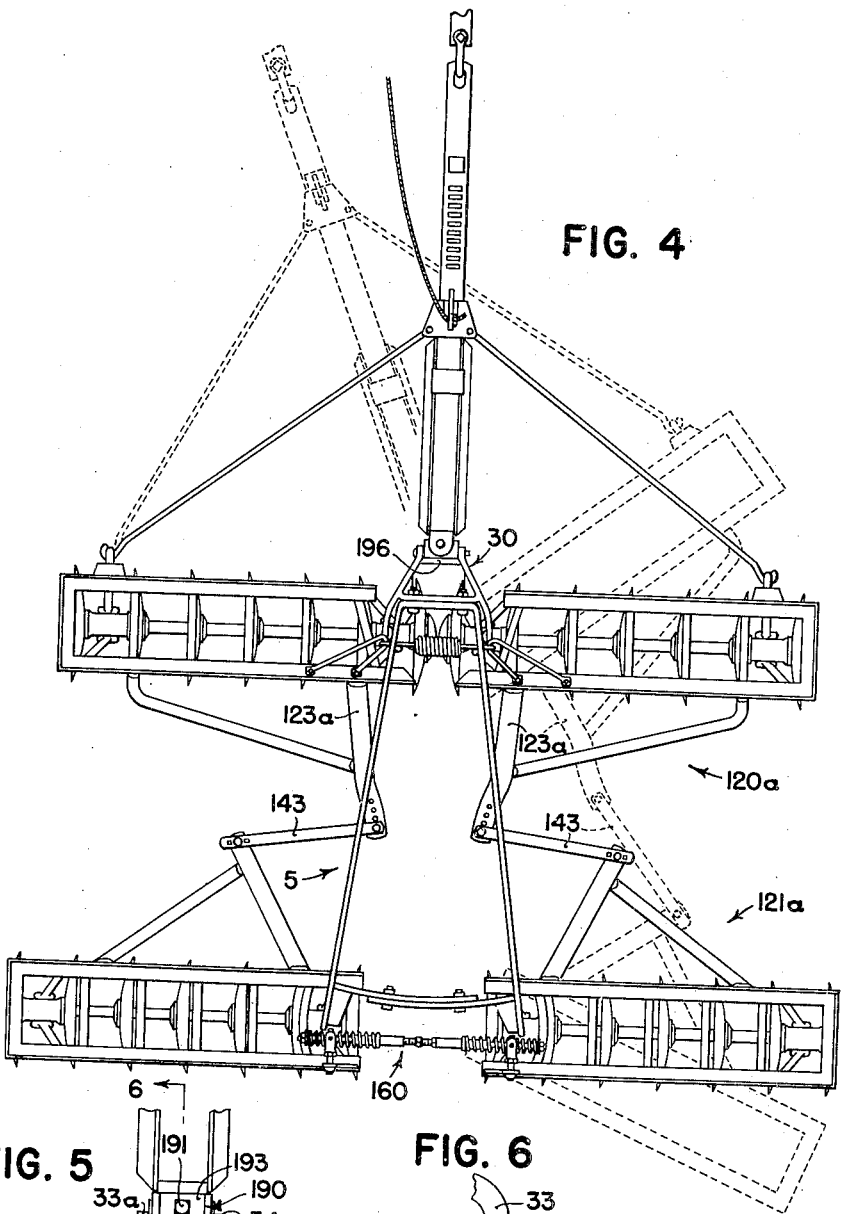
Figure 4 is a view of the harrow shown in Figure 3 but in transport position, this figure also illustrating the manner in which the harrows of both Figures 1 and 3 negotiate a turn when in operating position.

Figures 3 and 4 show a slightly modified form of disk harrow. Generally speaking, the construction is substantially the same as that described above, and hence for corresponding parts the same reference characters have been employed. In this form, the brackets 101a and 102a, to which the spring member 108 is connected at its ends, are bolted to the rear frame bars 17a of the front gangs. Also, the brackets 101a and 102a, together with the associated spring 108, are disposed underneath the forward portions of the longitudinal frame bars 71 and 72. Further, the angling arm assemblies 120a, substantially the same as the angling arm assemblies 120 described above, have both sections 122a and 123a welded to the rear side of the associated gang frame bars. Likewise, the rear angling arm assemblies 121a are welded to the front bars of the rear gang frames. The links 143 in Figure 3 are connected in about the same relations as described above.

In Figures 3 and 4 the means resisting upthrust of the rear gangs is connected directly from one rear gang to the other and is not arranged to react against the frame, as in the construction shown in Figures 1 and 2. This construction is satisfactory where operating conditions are fairly uniform. The upthrust resisting means shown in Figures 3 and 4 is indicated in its entirety by the reference numeral 160 and comprises a rod 161 having threaded sections 162 and an intermediate polygonal portion 163 provided for turning the rod 161. A pair of sleeves 165 have threaded connections with the rod 161, the threaded portions 162 and the corresponding sleeves 165 being formed with right and left hand threads. A pair of compression springs 166 surrounds the rotatable member 161 and bear at their laterally inner ends against the sleeves 165, respectively, and at their outer ends against swivels which are mounted by trunnions in yokes 168. Each one of the yokes is bolted to a bracket 169 which is secured to an upstanding flange on the frame of the associated gang. A cushioning spring 171 extends outwardly from each swivel, just mentioned, to an adjusting nut 172 carried by the rod at each end thereof. The springs 166 resist the upthrust due to the soil pressure against the lower edges of the disks of the rear gangs, while the springs 171 resist the downward movement of the outer ends of the gangs, as when passing over depressions. It will be noted from Figure 3 that both of the spring upthrust resisting means 108 and 160 operate independent of the frame 5.

The operation of the harrow shown in Figures 3 and 4 is subrstantially the same as the operation of the harrow described above, particularly so far as the accelerated movement of the front gangs with respect to a given displacement of the associated rear gangs. In Figure 4 I have shown in dotted lines the position the harrow of Figure 3 assumes when making a turn to the left when in angled operating position. For convenience in illustrating, the left-hand front and rear gangs are assumed as being in a position the same as the front and rear left gangs when the harrow is in transport or straightened position. It will be noted that when making a turn, the front gang angling arm 123a of the angling link 143a moves into substantially a straight line position in which additional resistance to which the rear gang may be subjected is effectively opposed by the associated front gang for, in the dotted line position, the lever arm A approaches zero. It may also be considered that the dotted line position of the harrow shown in Figure 4 represents a maximum displacement which the gangs may experience if one of the rear gangs encounters an additional resistance. Where the arm 123a and the link 143 occupy substantially a straight line position, it will be seen that the additional soil resistance which the new angle of the front gang imposes thereon acts with greatly increased leverage against the rear gang tending to restore the same to the normal operating position shown in Figure 3.

The harrow shown in Figures 1 and 2, as well as the harrow shown in Figures 3 and 4, is convertible from a tandem or double action disk harrow to a single action disk harrow, whenever it is desired to employ the implement as supplementary to another implement, such as a rolling stalk cutter. With equipment of this kind, the single action disk harrow is effective to thoroughly chop up and disk cotton stalks or corn stalks; the use of a double action or tandem disk harrow behind a roller stalk cutter might require excessive power which would otherwise not be necessary. Hence, the provision of means whereby the tandem or double action disk harrow can be converted easily and quickly into a single action disk harrow is an important feature of this invention.

Figure 5:
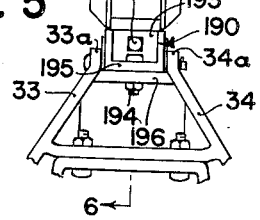
Figure 5 is a fragmentary top or plan view, showing the use of a bracket for connecting the draft member rigidly to the frame means of the front gangs when the rear gangs are detached and the front gangs used as a single action harrow.
Figure 6:
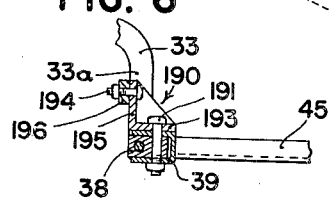
Figure 6 is a view taken generally along the line 6—6 of Figure 5.

It will be remembered that, in the double action or tandem disk harrow, the hitch means 2 is pivotally connected with the front gang for generally vertical swinging movement. As pointed out in the above-mentioned patent, by having a hitch which is free to float up and down, there is no tilting of the front gangs or any interfering with the uniform work of the harrow as the tractor moves over rough ground. However, a stiff hitch is required for a single action disk harrow, and to this end I provide a bracket 190 (Figures 5 and 6), which is in the nature of an angle member. The bracket 190 is adapted to be disposed between the downturned ends 33a and 34a of the frame members 33 and 34 after the pin or bolt 40 has been removed and the same, or another bolt 191, inserted through an opening in the horizontal section 193 of the bracket 190 and through the openings in the swivel 38 and the yoke 39 through which the pivot bolt 40 normally is disposed. A bolt 194 is adapted to be inserted through a vertical wall 195 of the bracket 190 and a cross bar 196 which forms a part of the front frame section 30. When the bolts 191 and 194 are tightened the draft member 44 is held rigidly with the frame section 30. The conversion of the double action harrow into a single action harrow is completed by detaching the rear frame section 31 and the rear gangs 20 and 21, together with the associated links 143. In the case of the harrow shown in Figures 1 and 2, the front angling arm assemblies 120 may be conveniently detached by removing the bolts 126 and 127. As will be obvious, the harrow may be reconverted back into a tandem double action harrow by connecting the rear frame section 31 and the associated rear gangs and linkage connections with the front gangs. It will, of course, be necessary to remove the bracket 190 so as to permit the drawbar to float.

While I have shown and described above the preferred means in which the principles of the present invention have been incorporated, it is to be understood, however, that my invention is not to be limited to the particular means shown and described above, but that, in fact, widely different means may be employed in the practice of the broader aspects of my invention. For example, while front and rear spring means have been shown as serving to resist upthrust of the front and rear gangs, I have found that for the smaller sizes yielding means is not necessary and that tension or compression members may be connected with the front and rear gangs for resisting upthrust and that no yielding is necessary.

What I claim, therefore, and desire to secure by Letters Patent is:

1. A disk harrow comprising a disk gang adapted to swing into and out of an angled working position, displaceable ground engaging means associated with said gang, and connections between the latter and said ground engaging means, said connections comprising arm and link means movable with said gang and said ground engaging means and arranged so that, when said gang tends to be displaced out of working position by an increase in the ground resistance encountered thereby, the effective mechanical advantage at which said ground engaging means acts against said gang is increased by an amount proportionally greater than the increased resistance encountered by said gang, whereby the latter is held against substantial displacement.

2. A disk harrow comprising two disk gangs arranged for generally horizontal swinging movement about relatively fixed pivot axes into and out of angled working position, and connections between said gangs arranged so that angular movement of one of the gangs in one direction out of said working position causes the other gang to move through an appreciably greater angle in the opposite direction, whereby the additional resistance encountered by said other gang tends to restore said one gang to its working position.

3. A disk harrow comprising means serving as a unitary rigid frame, pairs of front and rear gangs pivotally connected with said frame means for swinging into and out of angled working position, and a link pivoted to each rear gang and to the companion front gang, each of said links being disposed in a line that, when the gangs are in a position adjacent their angled working position, passes close to the pivot axis of one of the associated gangs and at an appreciable distance from the axis of the other associated gang, whereby an increase in the resistance encountered by the latter is overcome by the relatively great amount of movement of said one gang which a relatively small amount of movement of said other gang under said increased resistance causes.

4. A double action disk harrow comprising two pairs of disk gangs arranged in tandem, rigid frame means to which each gang is pivotally connected, each gang being arranged to swing horizontally relative to the frame into and out of angled working position, means for holding one of said pairs of gangs in angled working position, said one pair of gangs being arranged whereby rearward swinging of one gang under increased resistance to forward movement reacts against said frame and the other gang to swing said other gang into an increased angle, thereby counterbalancing said increased resistance, said other pair of gangs being arranged so that when in angled working position rearward swinging of one gang under increased resistance to forward travel also reacts against said frame and acts to swing the other gang into a decreased angle, and means interconnecting said pairs of gangs whereby when the gangs are in angled working position rearward swinging of one gang of said second pair through a given extent of movement under an increased resistance encountered by said one gang reacts against the frame and causes the companion gang of said first pair to swing forwardly through an appreciably greater extent of movement into a position of greater angle, thereby counterbalancing said increased resistance and tending to hold said companion gang against movement out of proper working position notwithstanding said increased resistance encountered thereby.

5. A disk harrow comprising frame means, pairs of front and rear gangs pivotally connected for generally fore and aft swinging movement relative to said frame means, a pair of generally rearwardly extending arms fixed, respectively, to said front gangs, a pair of arms fixed, respectively, to said rear gangs, and a link pivoted to the outer ends of and connecting the arms at each side of the harrow, the pivot points between each link and the associated arms being such that when the gangs are angled into working position the line of each link and the line connecting the pivot axis of the associated gang and the pivot between the link and the front arm approach a straight line relation, whereby the resistance of either front gang to forward displacement is effective to hold the associated rear gang against excessive rearward displacement.

6. A disk harrow comprising a pair of front gangs, frame means therefor, a pair of rear gangs, frame means for the rear gangs, each gang being pivoted to the associated frame means for generally horizontal swinging movement, means for detachably connecting said two frame means, a generally rearwardly extending angling arm detachably connected to each of said front gangs, a generally forwardly extending angling arm connected to each of the rear gangs, a link pivotally connected at its opposite ends to the angling arms at each side of the harrow whereby when the front gangs are swung in one direction into an angled working position the rear gangs are swung in the opposite direction in their angled working position, the pivots of each link and the associated angling arms being disposed relative to the axes of movement of the associated gangs so that movement of either rear gang in one direction through a given angle out of its angled working position causes an appreciably greater angular movement of the associated front gang in the opposite direction, generally vertically swingable hitch means connected with said front frame means and said front gangs, means detachably connecting the rear frame means to said front frame means, and means for rigidly connecting said hitch means with said front frame means when the rear frame means and the front angling arms are disconnected, respectively, from said front frame means and said front gangs.

7. In a convertible disk harrow having a front gang, a draft member normally movable relative thereto, and a detachable rear gang, a rigid bracket member, and means adapted to connect the latter with said draft member when the rear gang is disconnected for converting the front gang and draft member into a single action disk harrow.

8. In a disk harrow, a generally horizontally swingable gang having frame means including a frame bar, an angling arm comprising a tension section and a compression section, and means fixing the tension section to one side of said frame bar and the compression section to the other side.

9. A convertible disk harrow comprising a pair of front gangs, a pair of rear gangs, frame means for said gangs including means serving as separable sections accommodating the detachment of the rear gangs from the front gangs when converting the harrow from the double action disk harrow into a single action disk harrow, and yielding means disposed generally transversely between said front gangs, said yielding means clearing said frame means and serving to resist upthrust of the front gangs both when they form a part of the double action disk harrow and when they form a part of a single action disk harrow.

10. A disk harrow comprising a pair of disk gangs, means serving as a frame with which said gangs are connected for generally vertical swinging movement, and yielding means disposed generally transversely of and spaced from said frame means and connected with said gangs for resisting upthrust thereof independently of the position of said gangs relative to said frame means.

11. A disk harrow comprising frame means, a pair of front and rear gangs swingable generally vertically relative to said frame means, yielding means disposed generally transversely of and spaced from said frame means and connected with one of said pair of gangs for resisting upthrust thereof independently of the position of said gangs relative to said frame means, and yielding means connected between said frame means and the gangs of the other pair for resisting upthrust of said other pair of gangs and yieldingly holding said frame means against displacement relative thereto.

12. A disk harrow comprising frame means, a pair of disk gangs connected with said frame means for generally vertical swinging movement, brackets fixed to said frame means above and laterally inwardly of the axes of swinging movement of said gangs relative to said frame means, and transversely disposed spring means reacting at their inner ends against said brackets.

13. A disk harrow comprising a pair of disk gangs, means serving as a frame to which the inner ends of said gangs are connected for generally vertical swinging movement, bracket means connected with each gang, and means adjustable as to length extending transversely of said frame means and connected at its ends to said bracket means for resisting upthrust of said gangs.

14. In a disk harrow, a disk gang, frame means with which said gang is connected for swinging movement, a member connected at one end with said gang, and means serving as a pair of springs connected between the other end of said member and said frame means, one spring resisting upthrust of the gang in one direction and the other spring yieldingly limiting the movement of said gang in the other direction.

15. A disk harrow gang comprising frame means, a rotatable gang shaft, bearing means therefor, bracket means connecting said bearing means with said frame means, and a hitch connection carried by said bracket means.

16. A disk harrow gang comprising frame means, a rotatable gang shaft, bearing means therefor, and a pair of brackets connecting the frame and bearing means, one of said brackets being formed with a looped portion to receive draft.

17. A disk harrow gang comprising frame means having front and rear frame bars, a rotatable gang shaft, bearing means therefor, a pair of brackets connecting said bearing means with said frame means, one of said brackets extending upwardly and rearwardly from said bearing means to the rear frame bar and the other bracket extending generally forwardly from said bearing means and having a looped portion at its forward end, and a generally vertically disposed bracket connected at its upper end with the front frame bar and formed at its lower end to receive the looped portion of said forwardly extending bracket.

18. A disk harrow comprising frame means, front and rear gangs swingably connected with said frame means and movable in opposite directions into and out of angled working positions, motion transmitting means and means connecting same with the gangs whereby turning movement is transmitted from one gang to the other through unequal moment arms when the gangs are disposed in their operating range of angled working positions.

19. A convertible disk harrow comprising a pair of front gangs, draft means swingably connected with said front gangs, a pair of rear gangs, detachable connections between said gangs to form a double action disk harrow, and means for securing said draft means rigidly to the front gangs when said connections and the rear gangs are detached from the front gangs.

20. A disk harrow comprising a pair of disk gangs, means with which said gangs are connected for generally vertical swinging movement, a bracket fixed to each gang, and a single spring disposed transversely of said means and connected with said brackets at points spaced from the axes of swinging movement for resisting upthrust of said gangs in all working positions thereof.

21. A disk harrow comprising a pair of front gangs, a pair of rear gangs, means with which said front gangs are connected for generally vertical swinging movement for applying draft thereto, yielding means disposed generally transversely of said draft applying means and connected with the gangs for resisting generally vertical displacement of the latter, means connected with said draft applying means for applying draft to said rear gangs and with which the latter are connected for generally vertical swinging movement, and yielding means extending generally transversely relative to said rear draft applying means and acting against the rear gangs for resisting generally vertical displacement thereof.

22. A disk harrow comprising a pair of disk gangs, means for applying draft to the gangs, the latter being pivotally connected with said means for generally vertical swinging movement about one or more axes, a bracket fixed to each gang, and spring biased rod means disposed transversely of the harrow and connected with said brackets so as to resist displacement of said gangs about said one or more axes.

23. In a disk harrow, the combination of two oppositely extending disk gangs, draft means for said gangs, a bracket secured to each of said gangs above the axis thereof, a pair of transversely extending rods pivotally supported, respectively, on said brackets, and spring means cooperating with said rods and acting through the latter and said brackets for resisting upthrust of said gangs.

24. In a disk harrow, the combination of two oppositely extending disk gangs, draft means for said gangs, a bracket secured to each of said gangs above the axis thereof, a pair of transversely extending rods pivotally supported, respectively, on said brackets, and spring means cooperating with said rods and acting through the latter and said brackets and reacting against said draft means for resisting upthrust of said gangs.

25. In a disk harrow, the combination of two oppositely extending disk gangs, draft means for said gangs, a bracket secured to each of said gangs above the axis thereof, a pair of transversely extending rods pivotally supported, respectively, on said brackets, bracket means with which the inner ends of said rods are slidably connected, said bracket means being connected with said draft means, and spring means cooperating with said rods and acting through the latter and said brackets and bracket means for resisting upthrust of said gangs.

26. In a disk harrow, the combination comprising a pair of frame members pivotally connected at inner ends and extending oppositely and outwardly therefrom for forward swinging movement at their outer ends, disk gangs connected to the frame members for movement therewith, arms supported from inner portions of the frame members, a spring connected to the arms for normally pulling the same together and exerting upward forces at the outer ends of the frame members, and the said arms inclining upwardly and rearwardly to dispose the spring in a plane rearwardly of the pivotal connections of the frame members.

27. In a disk harrow, the combination comprising a pair of frame members pivotally connected at inner ends and extending oppositely and outwardly therefrom for forward swinging movement at their outer ends, disk gangs connected to the frame members for movement therewith, arms supported from inner portions of the frame members, a spring connected to the arms for normally pulling the same together and exerting upward forces at the outer ends of the frame members, said spring being arranged to exert a pressure in a transverse line which is disposed rearwardly with respect to the transverse vertical plane passing through the pivotal connections of the frame members.

28. In a disk harrow, the combination comprising a pair of disk gangs arranged in outwardly and oppositely extending and mutually reacting relation, frame members connected to the gangs and pivotally connected at inner ends on substantially vertical axes, arms supported rigidly from inner portions of the frame members and extending substantially upwardly therefrom, and a retractile coil spring stretched between upper ends of the arms for exerting upward forces on outer ends of the frame members and thereby counteracting upward thrust at the center caused by reaction of the disk gangs.

29. A disk harrow comprising a pair of disk gangs, means serving as a frame with which said gangs are connected for generally vertical swinging movement and for forward and rearward swinging movement about substantially vertical axes, and yielding means disposed in back of said vertical axes extending generally transversely of and spaced from said frame means and connected with said gangs for increasingly resisting upthrust thereof responsive to forward swinging movement of said disk gangs.

30. In a disk harrow, the combination comprising a pair of disk gangs arranged in outwardly and oppositely extending and mutually reacting relation, frame members connected to the gangs and pivotally connected at their inner ends on substantially vertical axes for forward and rearward swinging movement, arms supported rigidly from inner portions of the frame members and extending substantially upwardly therefrom in back of said vertical axes, and a retractible coil spring stretched between upper ends of the arms for exerting upward forces on outer ends of the frame members and thereby counteracting upward thrust at the center caused by the reaction of the disk gangs, the tension of said spring increasing responsive to forward swinging movement of said disk gangs.

31. In a disk harrow the combination of a pair of disk gangs arranged in oppositely and outwardly extended positions and connected together at inner ends for forward and rearward angling adjustments and limited relative up and down movement, upwardly extending lever arms connected to inner end portions of the gangs, and a spring connected to the arms and operative to exert downward forces on outer ends of the gangs and counteract upward thrust thereon due to action of the disks in the soil.

32. A tandem disk harrow comprising front and rear pairs of outwardly spread and oppositely acting disk gangs having frame parts extending parallel with their respective axes, lever acting arms extending substantially upwardly from the frame parts of the forward gangs, a tension spring connected at its ends to the upper ends of said arms to exert equal downward forces on inner ends of the front gangs, and spring means for exerting downward forces on outer ends of the rear gangs.

33. A disk harrow comprising a pair of disk gangs, means serving as a frame with which said gangs are connected for generally vertical swinging movement, and for angling movement about vertical axes, bracket members connected with the respective gangs and extending upwardly, and a spring connected at its opposite ends with the respective upper ends of the bracket members and disposed rearwardly of said axes whereby the action of said spring will operate through said bracket members to variably resist upthrust imparted to either or both gangs depending on the angled relationship thereof.

34. A disk harrow comprising a pair of disk gangs, means serving as a frame with which said gangs are connected for generally vertical swinging movement, and for angling movement about vertical axes, transversely spaced bracket members connected with the respective gangs and extending upwardly with their upper ends disposed rearwardly of said vertical axes, and means adjustable as to length directly connecting the upper ends of the bracket members to resist upthrust of the gangs, said bracket connecting means including a resilient element.

CHARLES H. WHITE.